Figure 1:
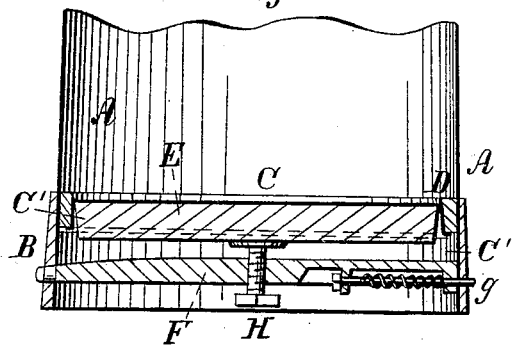
Figure 2:
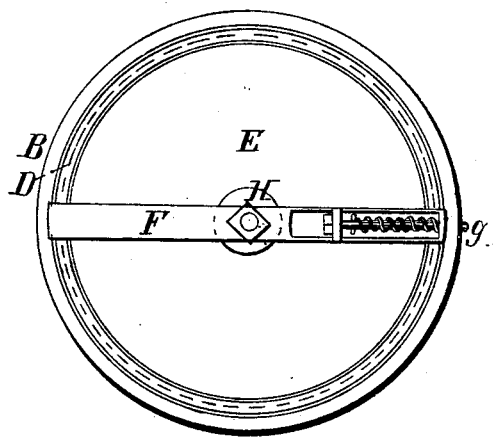

A. P. COOK.
Milk Can.

No. 81,345.  Patented Aug. 25, 1868.

Witnesses:
Fred. W. Scott
Henry H. Boner

Inventor:
Alonzo P. Cook.
by B. H. Muehle
his atty

UNITED STATES PATENT OFFICE.

ALONZO P. COOK, OF COLLINS CENTRE, NEW YORK, ASSIGNOR TO HIMSELF AND SYLVANUS B. COOK, OF SAME PLACE.

IMPROVEMENT IN MILK-CANS.

Specification forming part of Letters Patent No. 81,345, dated August 25, 1868.

*To all whom it may concern:*

Be it known that I, ALONZO P. COOK, of Collins Centre, in the county of Erie and State of New York, (assignor to myself and SYLVANUS B. COOK, of the same place,) have invented a certain new and useful Improvement in Milk-Cans; and I do hereby declare that the following is a full and exact description thereof, reference being had to the accompanying drawings, making a part of this specification, in which—

Figure I is a vertical section, and Fig. II is a bottom plan view.

The nature of this invention relates to an adjustable and removable bottom so connected to a metallic can or receptacle for milk, oil, or other fluid that it cannot leak or break, though subjected to the most violent jars occasioned by transportation in wagons or carts.

Letters of like name and kind refer to like parts in each of the figures.

A represents the sides of a common milk-can, the lower edge of which is strengthened by a circular metallic band, B, securely riveted or otherwise fastened thereto. The sides of the can, near the bottom, are made slightly beveling or flaring toward the edge, for the purpose of forming a suitable seat for the removable bottom C. This bottom C consists of a circular plate having a flange projecting downwardly and outwardly, as shown at $c'$. A packing-ring, D, made of rubber or other suitable material, is placed around said flange and between it and the beveled portion of the body of the can, into which the bottom is driven until it is perfectly tight.

E represents a disk, of wood or other material, which fits into the recess formed by the flange of the bottom plate, and acts as a follower, so as to prevent the bending of the latter under the weight of the fluid inside the can.

F represents a cross-bar, placed diametrically below the bottom, and which is made adjustable within the holes made through the sides for that purpose by means of the spring-bolt $g$, placed upon one end thereof.

H represents a central set-screw passing through the cross-bar, which set-screw is used for retaining the bottom plate in its proper place. Should a slight leakage occur, a turn of the set-screw will be sufficient to tighten the bottom plate in its seat, and thereby remedy the difficulty in an instant.

What I claim as my invention, and desire to secure by Letters Patent, is—

1. The removable bottom C, having a flange, $c'$, in combination with the packing-ring D, follower E, adjustable cross-bar F, and set-screw H, all parts being constructed, arranged, and operating substantially as herein described.

2. Making the sides of a metallic receptacle for milk or other fluid beveled or flaring near its lower end, in combination with the removable bottom C, substantially as herein described.

ALONZO P. COOK.

Witnesses:
 THO. CORLETT,
 B. H. MUEHLE.